Figure 1:
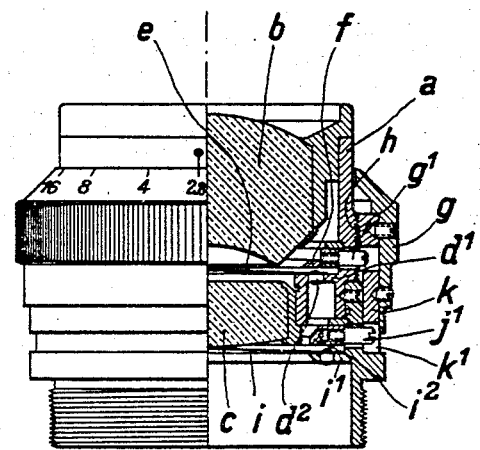

Nov. 22, 1938.                S. HUBER                    2,137,615

PHOTOGRAPHIC OBJECTIVE

Filed March 10, 1937

Inventor:

Sylvester Huber

Patented Nov. 22, 1938

2,137,615

UNITED STATES PATENT OFFICE 2,137,615

PHOTOGRAPHIC OBJECTIVE

Sylvester Huber, Jena, Germany, assignor to the firm Carl Zeiss, Jena, Germany

Application March 10, 1937, Serial No. 130,020
In Germany March 21, 1936

2 Claims. (Cl. 95—64)

It is often disturbing in photographic objectives that the lenses on the image side of a diaphragm image the aperture of the diaphragm on or near the layer sensitive to light, which is due to two-fold reflection of the imaging rays on the refracting surfaces of the lenses. Especially when photographs are taken against the light and the diaphragm aperture is to be narrowed down, the consequence will frequently be that the darker parts of the photographs are disturbed by bright spots or secondary images reducing the brilliancy of the photographs. Several suggestions have been made to diminish this disadvantage, one of them being to the effect of so positioning the diaphragm as to make the said phenomenon disturb the photograph as little as possible. As, however, the position of the diaphragm in the objectives is already determined by considerations as to repartition of light, astigmatism, flattening of the image field and distortion, the choice of a correct position for the diaphragm is largely restricted.

According to the present invention, the said inconvenience can be overcome to advantage by placing another diaphragm with adjustable aperture on the image side of the lenses which image in the image space the diaphragm determining the aperture of the objective. When the aperture of the first said diaphragm is being contracted, also the aperture of the said other diaphragm can be narrowed down, viz. to such an extent as not to prevent a complete illumination of the image. The two diaphragms are suitably coupled to each other, so that they can be adjusted conjointly by one single manipulation. To avoid the pencil of imaging rays being inadmissibly contracted by the diaphragm on the image side of the objective, the two diaphragms can be interconnected by a detachable coupling working in such a manner that closing the first said diaphragm by an actuating means couples automatically the diaphragm on the image side to the actuating means only after a definite rotation of these means, and that, when the first said diaphragm is being opened, the diaphragm on the image side disengages only subsequently to a corresponding rotation having been imparted to the said means. The two diaphragms can, however, be permanently coupled to each other. When iris diaphragms are concerned, the lag of the diaphragm on the image side of the objective with respect to the first said diaphragm can be suitably achieved by guiding the displaceable ends of the lamellae of this first said diaphragm in radial grooves and those of the diaphragm on the image side in grooves the direction of which deviates at a definite angle from the direction of the said radial grooves.

Figure 2:
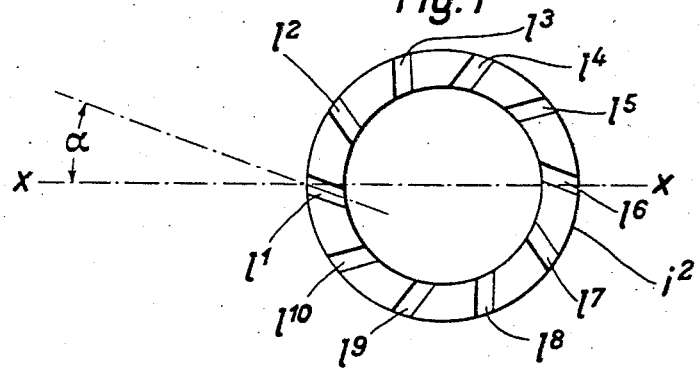

In the accompanying drawing, Figure 1 illustrates an objective of the last said kind partly in section through the axis of this objective and partly in a view, and Figure 2 is the view of a single part of the objective.

A mount $a$ contains two members $b$ and $c$ of a lens between which an iris diaphragm is disposed. The diaphragm consists of a ring $d^1$ which is rigidly connected to the mount $a$ and in which the diaphragm lamellae $e$ are rotatable about pins $d^2$. The displaceable ends of the lamellae $e$ engage in the known manner in radial grooves in a ring $f$ rotatable in the mount $a$. By means of a screw $g^1$, the ring $f$ is connected to a milled ring $g$ which is rotatable in a fine thread $h$ in the mount $a$ and serves for actuating the diaphragm. On the image side of the member $c$ of the objective is disposed another iris diaphragm, whose lamellae $i$ are disposed between a stationary ring $i^1$ and a rotatable ring $i^2$. The rotatable ring $i^2$ has a screw $j^1$ which extends into a recess $k^1$ in a ring $k$ rigidly connected to the milled ring $g$, the two diaphragms being thus rigidly connected to each other. The ring $i^2$, which Figure 2 represents in a view from below, has grooves $l^1, l^2 \ldots \ldots l^{10}$, which guide the displaceable ends of the lamellae $i$. As is obvious from the drawing, the grooves $l^1, l^2 \ldots \ldots l^{10}$ are not radial, but include with the radial direction X—X an angle $\alpha$, which has the magnitude 20° in the case of the drawing.

When the milled ring $g$ is rotated from the position corresponding to the greatest aperture of the objective in such a manner as to contract the diaphragm apertures, both diaphragms are being closed, the diaphragm on the image side, however, with a definite lag as compared to the other diaphragm, as a consequence of which this diaphragm on the image side does not prevent the image field from being illuminated completely.

I claim:

1. In a photographic objective, a diaphragm with adjustable aperture, lens members disposed at least partly on the image side of the said diaphragm, another diaphragm with adjustable aperture, this other diaphragm being disposed on the image side of the said lens members, and an actuating device, this actuating device being coupled to the said two diaphragms in such a manner that the diaphragm on the image side of the said lens members covers those parts of the opening of the objective which are not traversed by the imaging rays.

2. In a photographic objective, an iris diaphragm which serves as an aperture diaphragm, lens members disposed at least partly on the image side of the said diaphragm, another iris diaphragm, this other iris diaphragm being disposed on the image side of the said lens members, each of the said diaphragms comprising a stationary member, lamellae and a rotatable annular member, the one end of each lamella being rotatably mounted in the stationary member, and the other end of each lamella being displaceable in a groove in the said rotatable annular member, the grooves in the rotatable annular member of the first said diaphragm being radial, and the direction of the grooves in the rotatable annular member of the said other diaphragm including an angle with the radial direction, and an actuating device, this actuating device being permanently coupled to the rotatable annular members of the two iris diaphragms.

SYLVESTER HUBER.